United States Patent [19]
Emmenthal et al.

[11] Patent Number: 4,832,586
[45] Date of Patent: May 23, 1989

[54] DRIVE ASSEMBLY WITH DIFFERENT ECCENTRICITIES

[75] Inventors: Klaus-Dieter Emmenthal; Claus Müller; Otto Schaäfer, all of Wolfsburg, Fed. Rep. of Germany

[73] Assignee: Volkswagen AG, Wolfsburg, Fed. Rep. of Germany

[21] Appl. No.: 200,612

[22] Filed: May 31, 1988

[30] Foreign Application Priority Data

Jun. 26, 1987 [DE] Fed. Rep. of Germany ....... 3721155

[51] Int. Cl.$^4$ .......................... F01C 1/04; F01C 17/06; F04C 18/04; F16C 3/26
[52] U.S. Cl. ........................................ 418/55; 418/57; 74/86
[58] Field of Search ..................... 418/55, 57, 59, 182, 418/270; 74/86; 464/102

[56] References Cited

U.S. PATENT DOCUMENTS 4,300,875  11/1981  Fischer et al. .......................... 418/55

FOREIGN PATENT DOCUMENTS

| 3107231 | 9/1982 | Fed. Rep. of Germany . |
| 3538522 | 12/1986 | Fed. Rep. of Germany ........ 418/55 |
| 61-175201 | 8/1986 | Japan ..................................... 418/55 |
| 61-182401 | 8/1986 | Japan ..................................... 418/55 |

OTHER PUBLICATIONS

Motortechnische Zeitschrift, 1985, "VW's Mechanical Driven Super Charger" by Hans-Dieter Emmenthal et al.

Primary Examiner—John J. Vrablik
Attorney, Agent, or Firm—Brumbaugh, Graves, Donohue & Raymond

[57] ABSTRACT

In the embodiment of the invention described in the specification, a drive assembly for an eccentrically driven mass has a drive shaft which drives the mass by a first eccentric device and a secondary shaft, driven synchronously with the drive shaft, which drives a second eccentric device spaced from the first eccentric device so as to guide the mass in a constrained manner. The connection between the second eccentric device and the mass includes a resilient mounting. In order to avoid, or at least reduce, sinusoidally varying stresses imposed on the resilient mounting during operation as a result of deflection of the drive shaft, the eccentricity of the second eccentric device is larger than the eccentricity of the first eccentric device by at least a portion of the magnitude of the maximum deflection of the drive shaft in the region of the mass occurring during operation.

3 Claims, 1 Drawing Sheet

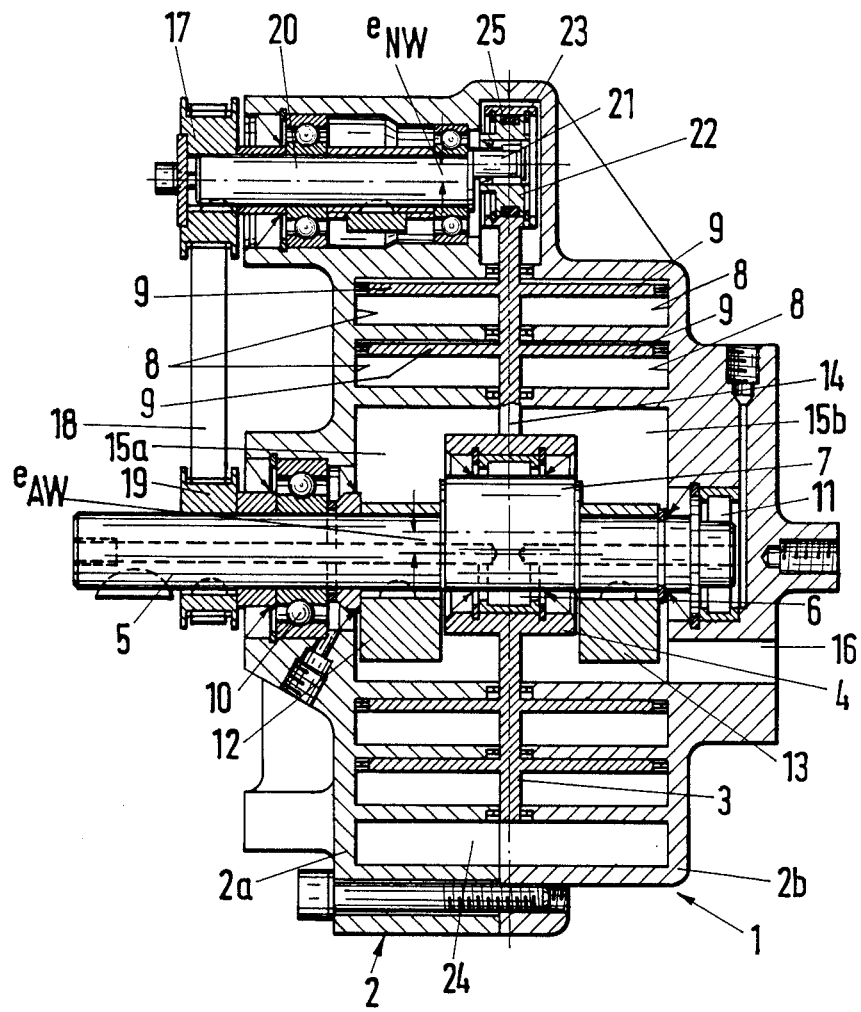

DRIVE ASSEMBLY WITH DIFFERENT ECCENTRICITIES

BACKGROUND OF THE INVENTION

This invention relates to drive assemblies for eccentrically driven masses having a resilient mounting and, more particularly, to a new and improved drive assembly which avoids degradation of the resilient mounting.

In displacement machines for compressible media which have been proposed as superchargers for engines of passenger automobiles (e.g., "Motortechnische Zeitschrift, 1985, pp. 323-327), the drive assembly is composed of two eccentric devices. The first eccentric device is provided between a centered drive shaft and a driven mass, which in this case consists of a plate formed with spiral displacement ridges on both sides. The second eccentric device is arranged between a secondary shaft, disposed parallel to the drive shaft and driven synchronously therewith, and a bearing boss at the outer periphery of the plate. The drive shaft and the secondary shaft are joined by a toothed drive belt and the eccentricities of the two eccentric drives are the same.

In order to avoid imposing unacceptably high stresses on the moving parts which might occur as a result of manufacturing tolerance build-up or thermal expansion of the eccentrically driven mass, the mounting of the secondary shaft or of the second eccentric device on the secondary shaft or of the driven mass may include a resilient mounting as exemplified by German Offenlegungsschrift No. 31 07 231.

It has been found, however, that the drive shaft is deflected in the region of the driven mass during operation of such a displacement supercharger, which causes an increase in the crank radius by which the drive shaft drives the driven mass. Moreover, the deflection increases as the speed of the drive shaft increases. However, since the eccentricity of the bearing boss with respect to the secondary shaft does not change, a sinusoidal deformation force acts on the driven mass during rotation of the drive shaft, imposing a varying load on the resilient mounting of the guide bearing of the second eccentric device. At high supercharger speeds, a rubber element provided as the resilient mounting is thus acted on by a high-frequency repeated load which may cause destruction of the rubber element.

SUMMARY OF THE INVENTION

Accordingly, it is an object of the present invention to provide a drive assembly which overcomes the above-mentioned disadvantages of the prior art.

Another object of the invention is to provide a drive assembly of the above-described type in which sinusoidal deformation loads on the eccentrically driven mass are reduced during operation, thereby reducing the tendency for the resilient mountings to be destroyed.

These and other objects of the invention are attained by providing a drive system for a mass which is eccentrically driven by a first eccentric device connected to a drive shaft and which has a second eccentric device connected to a secondary shaft driven synchronously with the drive shaft wherein the eccentricities of the first and second eccentric devices are different. According to the invention, the eccentricities of the two eccentric devices are selected so that, when the mass is not being driven, the eccentricity of the second eccentric device is larger than that of the first eccentric device.

As a result, during operation of the drive system the repeated stresses on the guide bearing of the second eccentric device resulting from deflection of the drive shaft are at least partially compensated for. Although larger pulsating stresses will occur in the guide bearing at low drive speeds in comparison with a drive system having precisely equal eccentricity of the two eccentric devices, such stresses can be tolerated more easily than the high-frequency pulsating stresses which occur, for example, at high speeds with equal eccentricity of the eccentric devices.

The eccentricities of the eccentric devices may be selected so that the eccentricity of the second eccentric device exceeds the eccentricity of the first eccentric device be exactly the amount of the deflection of the drive shaft in the region of the driven mass, and may take into account any deformation of the mass, during operation at a normal operating speed or at the average of a normal operating speed range. When there is essentially a single normal operating speed for the drive assembly providing an essentially constant speed of the drive shaft, the difference between the eccentricities is selected based upon the deflection of the drive shaft in the region of the driven mass at that normal operating speed. For variable-speed drive assemblies, the selection of a difference in the eccentricities based upon the deflection of the drive shaft at an average or mean operating speed will still result in high-frequency repeated loads at maximum operating speeds, but these will be substantially smaller than the loads to which present drive systems are subjected and they can be tolerated because such maximum load conditions occur relatively rarely. For fixed operating speed systems, the invention effectively eliminates sinusoidally varying loads resulting from distortion during operation and such loads will be encountered only during starting and stopping of the drive assembly when lower speed ranges are present.

BRIEF DESCRIPTION OF THE DRAWING

The accompanying drawing is a longitudinal sectional view illustrating a representative embodiment of a drive system in accordance with the invention.

DESCRIPTION OF PREFERRED EMBODIMENTS

In the accompanying drawing, a displacement machine 1, designed as a supercharger for the internal combustion engine of a passenger automobile, includes a housing 2 divided centrally into two housing sections 2a and 2b. Between the two housing sections 2a and 2b, a disk-like rotor 3 having a center hub 4 containing a rolling bearing 6 is supported on an eccentric collar 7 of a drive shaft 5.

The two housing sections 2a and 2b have corresponding opposed spiral slots 8 which cooperate to form spiral displacement chambers. Within the displacement chambers, spiral ridge-like displacement bodies 9 are supported on the disk-like rotor 3 and project essentially perpendicularly therefrom into the opposing slots 8. In the particular embodiment shown in the drawing, each housing section 2a and 2b has two spiral-shaped displacement chambers 8 and two corresponding spiral-shaped displacement bodies 9 are arranged on either side of the rotor.

The drive shaft 5 is supported by two bearings 10 and 11 which are provided on opposite sides of the eccentric collar 7 and two balancing weights 12 and 13 are arranged on the shaft 5 adjacent to the eccentric collar 7. The eccentric weights 12 and 13, which are provided to balance the rotating centrifugal force generated by the eccentric drive of the rotor 3, rotate in corresponding spaces 15a and 15b which communicate with each other through an aperture 14 in the disk-like rotor 3 and with the outside through an opening 16 in the housing section 2b. The spaces 15a and 15b are at the inner end of the spiral displacement chambers 8 and they serve as collection chambers for the working medium conveyed by the displacement supercharger during operation. The working medium is delivered radially inwardly from an inlet chamber 24 arranged in the outer portion of the housing 2 by the circular movement of the displacement bodies 9 in the displacement chambers 8.

To guide the disk-like rotor 3, a second eccentric device is provided by an eccentric pin 21 having an eccentricity $e_{NW}$, mounted on a secondary shaft 20, which is supported parallel to the drive shaft 5, in the housing section 2a, the eccentric pin 21 being engaged by way of a bearing 22 in a bearing boss 23 at the outer periphery of the rotor 3. The secondary shaft 20 is driven synchronously from the drive shaft 5 by a toothed drive system including toothed gears 17 and 19 and a toothed belt 18.

As a result of being driven by the eccentric collar 7 of the drive shaft 5 and its connection to the second eccentric device, the disk-like rotor 3 is subjected to a constrained movement during which all points of the rotor describe circles having diameters which are double the eccentricity $e_{AW}$ of the collar 7. Thus, each point on the outer periphery of the displacement bodies 9 supported on the disk-like rotor 3 performs a circular movement bounded by the walls of the displacement chambers 8. Because the displacement chambers and the displacement bodies have different curvatures, a plurality of sickle-shaped working chambers are formed between them so that, when the rotor is driven, the working chambers are transposed radially inwardly through the displacement chambers 8 from the inlet chamber 24 to the spaces 15a and 15b which communicate with the outlet opening 16.

Whereas in prior art devices the eccentricities $e_{AW}$ and $e_{NW}$ formed by the eccentric collar 7 and the eccentric pin 21, respectively, were the same, according to the present invention the eccentricity $e_{NW}$ of the second eccentric device is larger than the eccentricity $e_{AW}$ of the first eccentric device. The difference between the eccentricities of the two eccentric devices is chosen so that it corresponds to at least a portion of the maximum deflection of the drive shaft 5 in the region of the disk-like rotor 3 which occurs during operation. Moreover, in selecting the eccentricities, any radial deformation of the disk-like rotor 3, e.g., in the region of the passages 14, occurring during operation may be taken into account.

Whereas in the prior art designs, in which the eccentricities of the two eccentric devices are equal, an increase in the drive crank radius is produced during operation by the deflection of the drive shaft which may be absorbed solely by a resilient mounting 25 between the bearing boss 23 and the bearing 22 of the eccentric pin 21, the provision of a larger eccentricity for the second eccentric device in accordance with the invention will result in a stress which in the rest condition is absorbed by the resilient mounting 25. During operation, however, that stress will be reduced by deformation of the drive shaft as the speed increases and will completely disappear at a selected design point. The selected point can then be chosen in such a manner that it coincides essentially with the most frequently attained operating speed of the displacement machine 1. In displacement machines for nonstationary drive assemblies, e.g., a passenger automobile engine, the said selected point is determined at a mean load or speed. Whenever the design speed is exceeded, the resilient mounting 25 is stressed by a sinusoidal stress having an amplitude, however, which is substantially smaller, and thus more acceptable, than those generated by the conventional design with equally dimensioned eccentricities for the two eccentric devices.

However, in the case of a constant-speed or stationary plant which is operated at an essentially constant load point, it is useful to select the difference between the eccentricities so that it corresponds to the deflection of the drive shaft occurring at the operating point. In that case, a varying load on the resilient mounting would practically never occur at the operating load point although, on starting and stopping of the drive system, lower-speed operating points with such varying loads would be temporarily encountered.

The essential advantage of the arrangement according to the invention consists in that, by the described selection of different eccentricities, a substantial reduction of the repeated load occurring in the guide bearing of the second eccentric device is obtained during operation of the displacement machine so that premature breakdown of the resilient mounting is avoided.

Although the invention has been described herein with reference to a specific embodiment, many modifications and variations therein will readily occur to those skilled in the art. Accordingly, all such variations and modifications are included within the intended scope of the invention.

We claim:

1. A drive assembly for an eccentrically driven mass comprising a drive shaft having a first eccentric device for driving the mass in an eccentric manner, a second eccentric device spaced from the first eccentric device and connected to the mass for controlled guiding of the motion of the mass, and a resilient mounting which is stressed by a difference in the effective eccentricities of the first and second eccentric devices, wherein the eccentricity of the second eccentric device is larger than the eccentricity of the first eccentric device by at least a fraction of the magnitude of the maximum deflection of the drive shaft in the region of the mass occurring during operation.

2. A drive assembly according to claim 1 wherein the eccentricity of the second eccentric device is larger than the eccentricity of the first eccentric device by the magnitude of the deflection of the drive shaft in the region of the mass occurring at a mean operating point in the range of operation of the drive assembly.

3. A drive assembly according to claim 2 wherein the difference between the eccentricities of the first and second eccentric devices takes into account a deformation of the eccentrically driven mass.

* * * * *